POWER SUPPLY FOR PULSE ELECTROPLATING
Filed Jan. 31, 1972
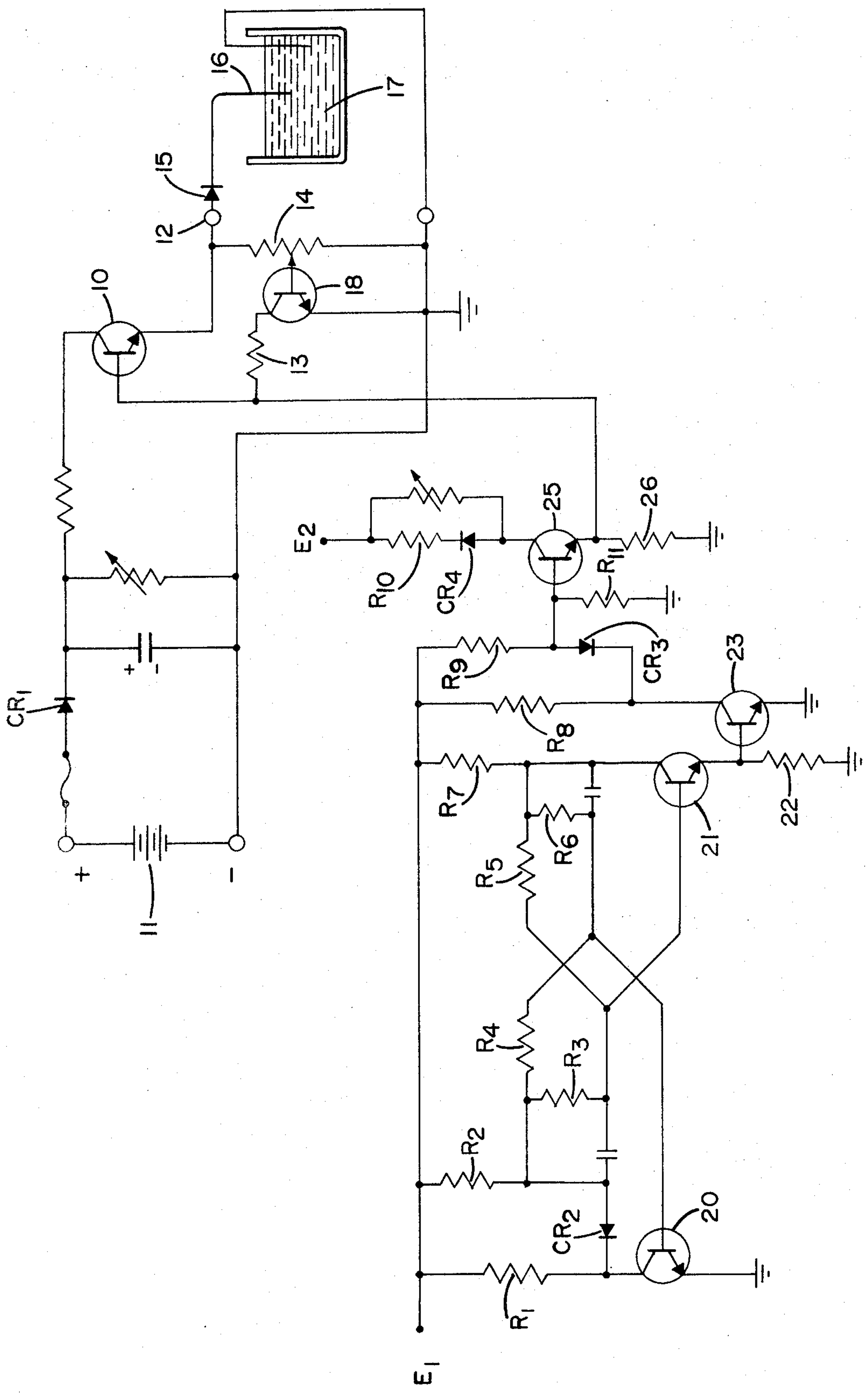

United States Patent Office 3,752,754
Patented Aug. 14, 1973

3,752,754
POWER SUPPLY FOR PULSE ELECTROPLATING
Roger A. Olson and Norman M. Osero, Amery, Wis., and Pat F. Mentone, St. Paul, Minn., assignors to Buckbee-Mears Company, St. Paul, Minn.
Filed Jan. 31, 1972, Ser. No. 222,221
Int. Cl. B01k 3/00
U.S. Cl. 204—228 5 Claims

ABSTRACT OF THE DISCLOSURE

A solid state switching device connected to an energy source is turned on and off by the signal output from a multivibrator to pass pulses of energy through an output terminal to an electrode located in an electroplating bath. A circuit coupled to the switch and output terminal limits the magnitude of the output pulse.

RELATING APPLICATIONS

Co-pending application by Pat F. Mentone, titled "Plating Metal Onto Small Flexibly Based Conductors," Ser. No. 206,822, filed Dec. 10, 1971 and assigned to the same assignee as the present application describes an electroplating process in which the instant invention is used.

BACKGROUND OF THE INVENTION

Field of the invention

The invention is used to produce pulses of a predetermined duration and magnitude for transmittal to suitable electrodes in an electroplating bath. A. J. Avila and M. J. Brown in an article titled "Design Factors in Pulse Plating" appearing at page 1105 in the November 1970 issue of "Plating" magazine describe some of the theories, purposes and advantages of using pulse plating. It has gained recent popularity because of the need to coat electronic circuits with precious metals such as gold.

SUMMARY OF THE INVENTION

A solid state switching device such as a transistor has an energy source connected to one electrode, an oscillating circuit, such as a multivibrator, connected to a control electrode and an output terminal connected to a third electrode. The multivibrator signal applied to the control electrode turns the transistor switch on and off allowing the energy from the input to pass through the switching device to the output terminal for feeding to a plating electrode located in an electroplating bath. A transistor circuit connected to the switching transistor and the output terminal acts to limit the magnitude of the output pulse.

BRIEF DESCRIPTION OF THE DRAWING

The single figure is a schematic illustration of a preferred embodiment of the invention.

DESCRIPTION OF THE PREFERRED EMBODIMENT

In the drawing, NPN transistor 10 has its collector connected through a current limiting resistor, a diode and a fuse to the positive side of a suitable DC power source 11. The parallel combination of an electrolytic capacitor and a variable resistance across the DC source 11 merely provides filtering for the energy coming from the source

11. The diode is merely to prevent damage to the circuit in the event the polarity of source 11 were reversed. The emitter electrode of transistor 10 is connected to output terminal 12 and a suitably oriented diode 15 is connected between the output terminal 12 and an electroplating electrode 16 which is immersed in an electroplating bath 17. The function of diode 15 is to prevent backward flow of current which might result from electrolytic action in the electroplating bath. Across the output from terminal 12 to the negative side of power source 11, is resistor 14 with its variable tap connected to the base of limiting transistor 18. The collector of transistor 18 is connected to the base of switching transistor 10 through resistor 13 and the emitter is connected to the negative side of power source 11.

NPN transistors 20 and 21 are cross coupled by suitable RC circuits in the usual fashion to form a free running multivibrator circuit. The operation of the multivibrator circuit is well known to those of ordinary skill in the art and does not in itself constitute a novel aspect of the instant invention. The output from the multivibrator appearing across resistor 22 in the emitter circuit of transistor 21 is fed through transistors 23 and 25 and their associated resistors and diodes which amplify and shape the output pulses from the multivibrator circuit. The resistor in the collector circuit of transistor 25 is made variable only to permit some adjustment of the gain. The pulses, appearing across resistor 26 in the emitter circuit of transistor 25, are then applied to the base electrode of transistor 10 to control the turning on and off of the transistor switch.

In operation, with the DC power source 11 energized and the multivibrator circuit comprising the cross coupled transistors 20 and 21 and associated components oscillating, positive going pulses across resistor 26 which are applied to the base of switch transistor 10 turn on the transistor permitting current to flow through the collector-emitter circuit of the transistor producing an output pulse across resistor 14 and at output terminal 12. The pulse at the output terminal 12 is fed through diode 15 to the plating electrode 16 in the electroplating bath 17. During the negative portion of the multivibrator output cycle, transistor 10 is cut off preventing the flow of current from power source 11 through the collector-emitter circuit of transistor 10.

The variable tap on resistor 14 provides a signal level to the base element of transistor 18 which is directly proportional to the output pulse. When the signal level on the base is sufficient to cause transistor 18 to conduct then the multivibrator output pulse is clamped through the collector-emitter circuit of transistor 18 thereby clamping the level of the output pulse at terminal 12. For example, assuming it takes a signal level of about .7 volt to turn on transistor 18, if the tap on resistor 14 is set about two-thirds down from the top, then a voltage level at terminal 12 of about 2.1 volts will initiate conduction of transistor 18 and the output pulse will then not be able to exceed a magnitude of 2.1 volts because the pulse applied to the base of transistor 10 will be unable to increase in magnitude due to conduction through the collector of transistor 18.

Although not shown, the multivibrator circuit may have adjustable resistors and/or capacitors so that the frequency of the oscillations of the multivibrator output may be varied, if desired.

Typically, some values or other suitable identification of some of the components shown in the schematic diagram in the drawing are as follows:

| | | |
|---|---|---|
| Transistors: | | |
| **10, 25** | | 2N 3772 |
| **18** | | 2N 3055 |
| **20, 21, 23** | | 2N 1613 |
| Resistors: | | |
| **22** | ohms | 180 |
| **26** | do | 33 |
| **14** | do | 100 |
| **13** | do | 10 |
| $R_1$ | do | 10,000 |
| $R_2$, $R_7$, $R_{10}$ | do | 1,000 |
| $R_3$, $R_6$ | do | 39,000 |
| $R_4$ | do | 30,000 |
| $R_5$ | do | 6,800 |
| $R_8$ | do | 4,700 |
| $R_9$, $R_{11}$ | do | 470 |
| $E_1$ | volts | 12 |
| $E_2$ | | (1) |
| Power source **11** | volts | 15 to 25 |
| Diodes—$CR_2$, $CR_3$, $CR_4$ | | 1N 645 |

1 Approximately 20 volts.

A circuit constructed according to the teachings of this invention was constructed to produce pulses having a magnitude of about 2.1 volts, a duration of about 10 milliseconds and a pulse repetition rate of about one pulse every 40 milliseconds.

We claim:

1. Apparatus for producing pulses of electrical energy for use in electroplating, comprising in combination: an input for receiving energy from a DC energy source; an electronic switch coupled to said input; an output terminal coupled to said switch; means for connecting the output terminal to an electroplating electrode; a multivibrator for producing a series of pulse signals; circuit means coupling the output signals from the multivibrator to said electronic switch for turning said switch on and off to control the passage of electrical energy pulses from said input to said electroplating electrode; and electrical circuit means coupled between said switch and the output terminal for limiting the magnitude of the output energy pulses.

2. The apparatus as set forth in claim 1 wherein said means for connecting the output terminal to the electroplating electrode includes a unidirectional conducting device oriented for preventing flow of electrical energy from the electrode back to said switch.

3. The apparatus as set forth in claim 1 wherein said electronic switch is a solid-state current-conducting device having at least three electrodes, the input being coupled to one of the electrodes, the output terminal being coupled to another of the electrodes and said circuit means for turning the switch on and off being coupled to still another of the electrodes.

4. The apparatus as set forth in claim 3 wherein said circuit means for limiting the magnitude of the output energy pulses is connected between the output terminal and said still another electrode.

5. The apparatus as set forth in claim 5 wherein said means for limiting the pulse magnitude comprises: another solid-state current-conducting device having at least three electrodes; means for applying at least a part of the output pulse to one electrode of said another device; and means coupling another electrode of said another device to said still another electrode of said first solid-state device, the arrangement being such that when the output pulse reaches a predetermined magnitude it causes said another device to conduct which clamps the magnitude of the signal which turns on the switch device.

References Cited

UNITED STATES PATENTS

| | | | |
|---|---|---|---|
| 2,951,978 | 9/1960 | Dickson et al. | 204—Dig. 9 |
| 3,276,976 | 10/1966 | Juliard | 204—Dig. 9 |
| 3,616,434 | 10/1971 | Hausner | 204—228 |
| 3,637,482 | 1/1972 | Vajda | 204—228 |

FOREIGN PATENTS

| | | | |
|---|---|---|---|
| 116,308 | 1/1958 | U.S.S.R. | 204—228 |

JOHN H. MACK, Primary Examiner

D. R. VALENTINE, Assistant Examiner

U.S. Cl. X.R.

204—Dig. 9